(12) United States Patent
Tapia

(10) Patent No.: US 11,018,958 B2
(45) Date of Patent: May 25, 2021

(54) COMMUNICATION NETWORK QUALITY OF EXPERIENCE EXTRAPOLATION AND DIAGNOSIS

(71) Applicant: TUPL, Inc, Bellevue, WA (US)

(72) Inventor: Pablo Tapia, Málaga (ES)

(73) Assignee: Tupl Inc, Bellevue, WA (US)

( * ) Notice: Subject to any disclaimer, the term of this patent is extended or adjusted under 35 U.S.C. 154(b) by 0 days.

(21) Appl. No.: 15/914,532

(22) Filed: Mar. 7, 2018

(65) Prior Publication Data

US 2018/0270126 A1 Sep. 20, 2018

Related U.S. Application Data

(60) Provisional application No. 62/471,317, filed on Mar. 14, 2017.

(51) Int. Cl.
*G06F 15/173* (2006.01)
*H04L 12/24* (2006.01)
(Continued)

(52) U.S. Cl.
CPC ...... *H04L 41/5067* (2013.01); *H04L 41/0609* (2013.01); *H04L 41/0681* (2013.01); *H04L 41/145* (2013.01); *H04L 41/16* (2013.01); *H04L 41/5009* (2013.01); *H04L 41/5032* (2013.01); *H04L 43/065* (2013.01); *H04L 43/08* (2013.01); *H04L 43/50* (2013.01); *H04L 47/24* (2013.01)

(58) Field of Classification Search
CPC ... H04L 41/5067; H04L 41/145; H04L 43/08; H04L 43/065; H04L 41/0681; H04L 41/16; H04L 41/0609; H04L 41/5032; H04L 41/5009; H04L 47/24; H04L 43/50
See application file for complete search history.

(56) References Cited

U.S. PATENT DOCUMENTS 9,716,633 B2 * 7/2017 Premkumar ............ H04L 41/16
2013/0182700 A1 * 7/2013 Figura .................... H04L 43/04
370/352

(Continued)

FOREIGN PATENT DOCUMENTS

WO 2016068926 A1 5/2016

OTHER PUBLICATIONS

International Search Report and Written Opinion for PCT/US2018/022078 filed on Mar. 12, 2018.

*Primary Examiner* — Umar Cheema
*Assistant Examiner* — Anh Nguyen

(57) ABSTRACT

A set of key performance indicators (KPIs) is calculated for a first set of user devices based on device performance data of the first set of more user devices or network performance data of a communication network that provides communication services to the first set of user devices. The device performance data has at least one of temporal or geographical commonality with the network performance data. A machine learning (ML) model is then trained based on training data, in which the training data includes the network performance data and the set of KPIs calculated for the first set of user devices. The ML model is applied to additional network performance data of the communication network to extrapolate one or more extrapolated KPIs for the first set of user devices or a second set of user devices.

20 Claims, 6 Drawing Sheets

(51) Int. Cl.
*H04L 12/26* (2006.01)
*H04L 12/851* (2013.01)

(56) References Cited

U.S. PATENT DOCUMENTS

| | | | |
|---|---|---|---|
| 2013/0237157 A1* | 9/2013 | Phan | H04W 24/00 |
| | | | 455/67.11 |
| 2014/0071814 A1* | 3/2014 | Landscheidt | H04L 41/0816 |
| | | | 370/229 |
| 2014/0269269 A1* | 9/2014 | Kovvali | H04W 24/04 |
| | | | 370/229 |
| 2015/0149613 A1* | 5/2015 | Kakadia | H04L 47/823 |
| | | | 709/224 |
| 2016/0021503 A1 | 1/2016 | Tapia | |
| 2016/0028594 A1 | 1/2016 | Ramakrishnan et al. | |
| 2017/0331673 A1* | 11/2017 | Iyer | H04L 41/16 |
| 2017/0364819 A1* | 12/2017 | Yang | G06N 7/005 |
| 2018/0019910 A1* | 1/2018 | Tsagkaris | H04B 7/04 |

* cited by examiner

COMMUNICATION NETWORK QUALITY OF EXPERIENCE EXTRAPOLATION AND DIAGNOSIS

CROSS REFERENCE TO RELATED PATENT APPLICATION

This application claims priority to U.S. Provisional Patent Application No. 62/471,317, filed on Mar. 14, 2017, entitled "Communication and Network Quality of Experience Extrapolation and Diagnosis," which is hereby incorporated by reference in its entirety.

BACKGROUND

Embodiments relate to determining key performance indicators (KPIs) in communications networks, and in particular to extrapolating such KPIs using a machine learning model.

Communication networks, such as wired telecommunication networks and wireless carrier networks, provide essential communication functions to organizations, businesses, and individual customers. However, communication network problems may be difficult to diagnose and resolve because of network complexity. For example, due to the rapid evolution of mobile communications technologies such as fourth generation (4G) and fifth generation (5G) systems, many wireless communication carriers have encountered limitations in analyzing and finding the root causes of problems experience by wireless carrier customers. Long Term Evolution (LTE) network performance issues may be difficult to troubleshoot using legacy network analysis methodologies that have been developed for use with third generation (3G) mobile communication technology. As a result, the customer care operations of wireless communication carriers may be unable to properly resolve customer complaints regarding 3G services.

Conventionally, when a communications problem event occurs, technicians may draw data from multiple sources to debug and/or diagnose the problem. For example, when a user's mobile device drops a call (the event), a technician may download data from the user's handset (user equipment) around the time of the dropped call and look for indicia of causes of the event. Quality of Service (QoS) and Quality of Experience (QoE) are typically used to discuss performance monitoring of Internet Protocol (IP) based networks. QoS is normally defining performance monitoring at the lower layers, i.e., the physical to the network layer or even the transport layer of the OSI reference model, while QoE is very closely connected to the application layer and the user subjective perception of the quality of which a service is presented. While QoS parameters are objective parameters that reflect the delivered service quality, QoE reflects user perceived experience of the quality of the delivered service end-to-end and as such it is a subjective measure. Both QoS and QoE may be measured using metrics, including in the form of key performance indicators (KPIs).

Conventionally, post-event handset data downloads were the only source of data for diagnosis of problems. Technicians have more recently gained the ability to perform diagnosis by correlating logs from monitoring applications in the base station and the core network. In some cases, technicians have access to network analytics, which allows the technicians to evaluate various monitoring application logs and/or real time telemetry. However, some types of problems are hard to estimate, even with network analytics to supplement handset data downloads. For example, outliers in performance data collected via conventional network analytics methods make it difficult to consistently provide reliable QoE estimates for a wireless carrier network. Additionally, conventional network analytics methods may not provide QoE diagnosis fast enough for a wireless carrier to respond to events.

BRIEF SUMMARY OF THE INVENTION

In an embodiment, one or more non-transitory computer-readable media core computer-executable instructions that upon execution cause one or more processors to perform acts comprising calculating a set of key performance indicators (KPIs) for a first set of user devices based on at least one of device performance data of the first set of user devices or network performance data of a communication network that provides communication services to the first set of user devices, wherein the device performance data has at least one of temporal or geographical commonality with the network performance data. The acts further comprise training a machine learning (ML) model based on training data that includes the network performance data and the set of KPIs calculated for the first set of user devices, and applying the ML model to additional network performance data of the communication network to extrapolate one or more extrapolated KPIs for the first set of user devices or a second set of user devices.

In an embodiment, a system comprises one or more processors and memory including a plurality of computer-executable components that are executable by the one or more processors to perform a plurality of actions. The plurality of actions comprise calculating a set of KPIs for a first set of user devices based on at least one of device performance data of the first set of user devices or network performance data of a communication network that provides communication services to the first set of user devices, wherein the device performance data having at least one of temporal or geographical commonality with the network performance data. The plurality of actions further comprise training a ML model based on training data that includes the device features of the first set of user devices and KPI data, the KPI data including at least one of the set of KPIs calculated for the first set of user devices or one or more training features, each training feature including a mathematical combination of multiple KPIs that belong to at least one of a specific time period or a specific area from the set of KPIs, and applying the ML model to additional device features of a second set of user devices to extrapolate one or more extrapolated KPIs for the second set of user devices.

In an embodiment, a computer-implemented method comprises receiving device performance data measured by monitoring applications on a first set of user devices, receiving network performance data of a communication network that provides communication services to the first set of user devices, wherein the device performance data having at least one of temporal or geographical commonality with the network performance data. The method further comprises calculating a set of KPIs for the first set of user devices based on at least one of device performance data of the first set of user devices or network performance data of the communication network, training a ML model based on training data that includes the network performance data and KPI data, the KPI data including at least one of the set of KPIs calculated for the first set of user devices or one or more training features, each training feature including a mathematical combination of multiple KPIs that belong to at least one of a specific time period or a specific area from the set of KPIs, applying the ML model to additional network performance data of the communication network to extrapolate one or more extrapolated KPIs for the second set of user devices, analyzing the one or more extrapolated KPIs according to one or more detection rules to detect a call issue that affects one or more user devices of the second set that are using the communication network or one or more network infrastructure elements of the communication network, and generating an alert regarding the call issue affecting the one or more user devices of the second set according to at least one alert rule.

DETAILED DESCRIPTION

Figure 1:
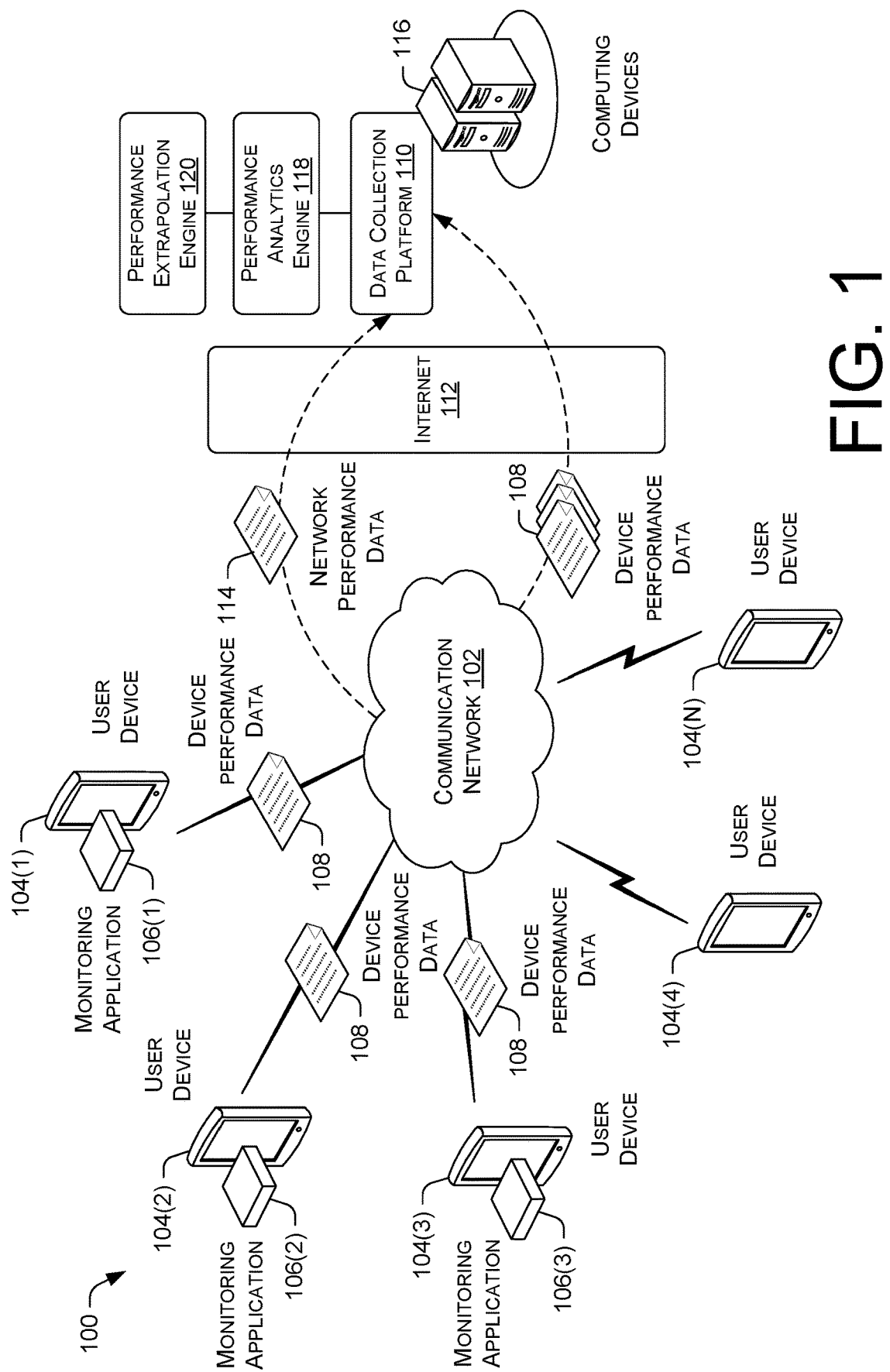
FIG. 1 illustrates an example architecture for analyzing performance data to assess quality of experience (QoE) for user devices that are using a communication network.

This disclosure is directed to techniques for analyzing performance data to assess the QoE of communication services that are provided by a wired or a wireless communication network. A performance analytics engine may receive performance data from a data collection platform. The data collection platform may collect device performance data from user devices. The user devices may include smart phones, tablets, phablets, and/or so forth. The data collection platform may further collect network performance data from communication network components of a communication network and/or third-party performance data from service providers. The communication network components of a communication network may include base stations, gateways, routers, servers, core network functionalities, and/or so forth. The service providers may include content providers, Application as a Service (ASP) providers, Software as a Service (SaaS) providers, and/or so forth.

In various embodiments, the performance analytics engine may be a custom analytics application that executes on top of the data collection platform. The performance analytics engine may generate QoE metrics in the form of key performance indicators (KPIs) from the performance data. Additionally, the performance analytics engine may generate alerts according to predefined alert rules. For example, a series of KPIs that are generated by the performance analytics engine over time may trigger an alert that an abnormal condition is developing with respect to some packet-related infrastructure components of a wireless carrier network. In another example, an alert rule may generate an alert to a customer who is experiencing call performance at home that Wi-Fi calling is not enabled. In other instances, the KPIs that are calculated may provide information about calls at a subscriber level, in which the information may be related to call durations, call drops, call access failures, one-way audio situations, and/or so forth.

In some embodiments, the performance analytics engine may use performance data that are extrapolated by a performance extrapolation engine to generate KPIs. In one implementation, the performance extrapolation engine may use a machine learning model to extrapolate KPIs for an additional set of user devices based on KPIs calculated for a particular set of user devices. The KPIs for the particular set of user devices may be calculated based on measured device performance data provided by the particular set of user devices. The measured device performance data may be obtained by monitoring applications that are installed on the particular set of user devices. Conversely, the additional set of user devices may include user devices that are unable to provide the device performance data. In some instances, the calculation of KPIs for the particular set of user devices may further involve the use of network performance data that correlates in time and/or area with the device performance data. In various instances, the area may be a geographical area, a business market area, or any other defined region. Subsequently, the KPIs calculated for the particular set of user devices and the network performance data may be used to train a machine learning model. The machine learning model is then applied to additional network performance data that is relevant to the extrapolation of the KPIs to generate a set of extrapolated KPIs for the additional set of user devices.

In another implementation, the additional set of user devices may share one or more common device features with the particular set of user devices. Accordingly, the commonality in device features may be used as a basis to create a machine learning model that is used to extrapolate the KPIs for the additional set of user devices from the calculated KPIs of the particular set of user devices.

In various embodiments, a set of key performance indicators (KPIs) is calculated for a first set of user devices based on device performance data of the first set of more user devices or network performance data of a communication network that provides communication services to the first set of user devices. The device performance data has at least one of temporal or geographical commonality with the network performance data. A machine learning (ML) model is then trained based on training data, in which the training data includes the network performance data and the set of KPIs calculated for the first set of user devices. In some alternative embodiments, the training data may include a combination of KPIs and one or more training features, in which a training feature is a mathematical combination of multiple KPIs from a specific time period and/or area. The ML model is applied to additional network performance data of the communication network to extrapolate one or more extrapolated KPIs for the first set of user devices or a second set of user devices.

The implementation of the performance analytics engine to execute in conjunction with the data collection platform may provide a unified and scalable solution for providing QoE diagnosis with respect to user devices of a communication network. The data collection platform may enable the use of custom analytics engines to provide KPIs to a wireless carrier network for different corporate sectors, such as network development, operations, and customer care. The KPIs that are provided by the performance analytics engine from the performance data may be otherwise overly burdensome or virtually impossible to manually obtain in a timely manner due to the large volume of call and web data that typically inundate a wireless carrier network. Further, the techniques may provide an advanced approach to customer care with proactive and individualized treatments of wireless subscribers in real time. The techniques described herein may be implemented in a number of ways. Example implementations are provided below with reference to the following FIGS. 1-6.

Example Architecture

FIG. 1 illustrates an example architecture for analyzing performance data to assess quality of experience (QoE) for user devices that are using a communication network. The architecture 100 may include a communication network 102 that is operated by a communication carrier, in which the communication network 102 may be a wireless carrier network or a wired carrier network. The communication network 102 may provide a wide range communication services, as well as ancillary services and features, to subscribers and associated device users. In various embodiments, the communication network 102 may provide wireless or wired communication between user devices 104(1)-104(N). Further, the communication network 102 may also provide communication between the user device 104(1)-104(N) and user devices that are external of the communication network 102. The user devices 104(1)-104(N) may include mobile handsets, smart phones, servers, laptop computers, tablet computers, personal digital assistants (PDAs), smart watches, game consoles, and/or other electronic devices.

The communication network 102 may be implemented using multiple interconnected networks. For example, where the communication network 102 is a wireless carrier network, the wireless carrier network may include multiple Radio Access Networks (RANs). The RANs may be connected to each other via regional ground networks. In turn, the regional ground networks may be connected to a core network by a wide area network (WAN). Each regional portion of the communication network 102, such as those serving the user devices 104(1)-104(N) may include one or more RANs and a regional circuit and/or packet switched network and associated signaling network facilities.

A RAN may include a number of base stations in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area. The BTS may send radio communication signals to user devices and receive radio communication signals from user devices. The RANs may carry the user communications for the user devices 104(1)-104(N) between the respective base stations and the core network.

The core network may connect to a public packet data communication network, such as the Internet 112. Packet communications via the RANs, the core network, and the Internet 112 may support a variety of services through the communication network 102. One embodiment, herein illustrated, is the Third Generation Partnership Project (3GPP) System Architecture Evolution (SAE), the Long Term Evolution (LTE) core network, which includes the Evolved Packet Core. The Evolved Packet Core (EPC) of the communication network 102 may use Evolved Packet System (EPS) bearer channels to route IP traffic from a gateway in the communication network 102 to a user device. A bearer channel is an IP packet flow with a defined quality of service (QoS) between the Packet Data Network (PDN) Gateway (PGW) and the user device. The eNodeB nodes may be interconnected with each other by interfaces. The communication between eNodeB nodes may include Radio Resource Management (RRM) control data, which may manage multiple functions of the eNodeB nodes. These functions may include radio bearer control, radio admission control, radio mobility control, scheduling, and dynamic allocations of resources to user devices in both uplink and downlink. Likewise, in instances in which the communication network 102 is a wired communication network, the network components may include servers, gateways, routers, and/or other network appliances that route communication calls.

The user devices 104(1)-104(N) may include user devices that are equipped with monitoring applications, as well as user devices that lack monitoring applications. For example, the user devices 104(1)-104(3) may be respectively equipped with monitoring applications 106(1)-106(3). Each of the monitoring applications 106(1)-106(3) may collect device performance data 108 from a corresponding user device as communication calls are initiated at the user device or received at the user device. In some embodiments, each monitoring application may obtain the device performance data 108 from a corresponding user device via an IP Multimedia Subsystem (IMS) stack trace of the user device. The monitoring applications 106(1)-106(3) may send the collected device performance data 108 through the communication network 102, such that a data collection platform 110 may receive the device performance data 108 via a communication connection with the communication network 102. For example, the communication connection may be the Internet 112, an intranet, or a combination of the Internet 112 and the intranet. In some embodiments, the device performance data 108 may include Voice over LTE (VoLTE) call data for VoLTE calls, non-VoLTE call data (e.g., circuit-switch call data), Wi-Fi call data, data packet transmission events, device event log data, IP application protocols data (e.g., protocol data pertaining to web browsing, email, video, etc.), and/or so forth, from a corresponding user device. In some embodiments, the device performance data 108 may include system event reports, bug reports, data traffic logs, data packet traces, and/or so forth. The data packet transmission events may include data packet transmission retry events, lost data packet events, duplicate data packet events, connection time out events, etc. In embodiments in which the communication network 102 is a wireless carrier network, subscriber identity module (SIM) applets or QoE applications on the user devices 104(1)-104(3) may alternatively or concurrently send handset reports that include the additional device performance data to the communication network 102. The device performance data 108 collected by a QoE monitoring application or a SIM applet may include parameters, measurements, and/or metrics associated with incoming and outgoing calls as the calls are handled by a corresponding user device. The device performance data 108 that are collected by a QoE monitoring application may further include application-level QoE data, such as web browsing response time, web browsing page download time, video interruptions, video quality, and/or so forth of one or more applications installed on the device.

The data collection platform 110 may further receive network performance data 114 from the communication network 102. The network performance data 114 may include data that is directly generated by the communication network 102 and/or generated by third-party service providers. The network performance data 114 may include measurements relevant to voice calls, such as RAN Operation Support System (OSS) counters, Call Detail Records (CDRs), VoLTE call traces, Session Initiation Protocol (SIP) trace data, Real-Time Transport Protocol (RTP) Control Protocol (RTCP) trace data, IP trace data (e.g., trace data for TCP/UDP, SIP, RTP, and/or so forth), etc. The network performance data 114 may further include measurements relevant to data uploads and downloads, such as network throughput, network bandwidth, network latency, server outage events, etc.

The data collection platform 110 may be implemented by one or more computing devices 116. In some embodiments, the computing devices 116 may be either physical servers or cloud-based virtual machines. The data collection platform 110 may include a cloud layer that controls hardware resources, and a data management layer that manages data processing and storage. The cloud layer may provide software utilities for managing computing and storage resources. In various embodiments, the cloud layer may provide a generic user interface for handling multiple underlying storage services (e.g., local servers, Amazon AWS, Digital Ocean, etc.) that stores the call data collected by the data collection platform 110. The cloud layer may also provide an integrated view of multiple servers and clusters from various providers, such as Hortonworks®, Cloudera®, MapR®, etc.). Additionally, the cloud layer may provide monitoring utilities to oversee utilization of resources and alerts for managing data storage or processing capacity. Accordingly, the cloud layer may facilitate the deployment, configuration, and activation of local and cloud servers, as well as facilitate the deployment, configuration, and activation of applications and/or services.

The data management layer may include software utilities and databases that facilitate the acquisition, processing, storage, reporting, and analysis of data from multiple data sources. In various embodiments, the data management layer may provide an API that decouples backend data management elements from data processing elements, such that the data may be distributed and stored in different data stores. For example, these data stores may include Hadoop Distributed File System (HDFS), Apache Spark, Apache HBase, and/or so forth. The API of the data management layer may be used by custom analytic engines and/or other third party tools to access the data in the different data stores. The data management layer may further include multiple data adaptors that are able to obtain multiple types of data from the communication network 102, such data may include RAN Operation Support System (OSS) counters, Call Detail Records (CDRs), call traces for packet-based communication calls, Session Initiation Protocol (SIP) trace data, Real-Time Transport Protocol (RTP) Control Protocol (RTCP) trace data, IP trace data (e.g., trace data for TCP/UDP, SIP, RTP, and/or so forth), and/or other data.

The performance analytics engine 118 may execute on the data collection platform 110 to analyze the performance data and provide analysis reports and alerts. In various embodiments, the performance analytics engine 118 may generate key performance indicators (KPIs) from the performance data based on KPI configuration settings. For instance, the KPIs that are calculated may provide QoE information about voice calls at a subscriber level, in which the information may be related to call durations, call drops, call access failures, one-way audio situations, call establishment times. The KPIs may also provide other QoE information, such as web browsing response time, web browsing page download time, video interruptions, video quality, device received signal strength, device received signal quality, and/or so forth. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements. Additionally, the performance analytics engine 118 may generate alerts according to predefined alert rules. For example, a series of KPIs that are generated by the performance analytics engine 118 over time may trigger an alert that an abnormal condition is developing with respect to some infrastructure components of the communication network 102. In another example, the performance analytics engine 118 may use an alert rule to alert a customer who is experiencing poor call performance at home that Wi-Fi calling is not enabled.

In some embodiments, the performance analytics engine 118 may use performance data that are extrapolated by the performance extrapolation engine 120 to generate KPIs. In one implementation, the performance extrapolation engine 120 may use a machine learning model to extrapolate KPIs for an additional set of user devices based on KPIs calculated for a particular set of user devices with respect to a certain time period and/or area of interest. For example, the particular set of user devices may be the user devices 104(1)-104(3), in which these user devices are equipped with monitoring applications 106(1)-106(3) that provide device performance data. On the other hand, the additional devices may include user devices 104(4)-104(N) that either lack monitoring applications or are otherwise unable to gather all the device performance data desired for the generation of the KPIs. The KPIs for the particular set of user devices may be calculated based on measured device performance data provided by the particular set of user devices. In some instances, the calculation of KPIs for the particular set of user devices may further involve the use of network performance data that correlates in time and/or area with the device performance data.

Subsequently, the performance extrapolation engine 120 may use the KPIs calculated for the particular set of user devices and the network performance data to train a machine learning model. The machine learning model is then applied by the performance extrapolation engine 120 to additional network performance data that is relevant to the extrapolation of the KPIs to generate a set of extrapolated KPIs for the additional set of user devices. The relevant additional network performance data may fall within the certain time period.

In another implementation, the additional set of user devices may share one or more common device features with the particular set of user devices. In such an implementation, the performance extrapolation engine 120 may use the KPIs calculated for the particular set of user devices and device features of the particular set of user devices to train a machine learning model. The machine learning model is then applied by the performance extrapolation engine 120 to device features of the additional set of user devices to generate a set of extrapolated KPIs for the additional set of user devices.

Example Computing Device Components

Figure 2:
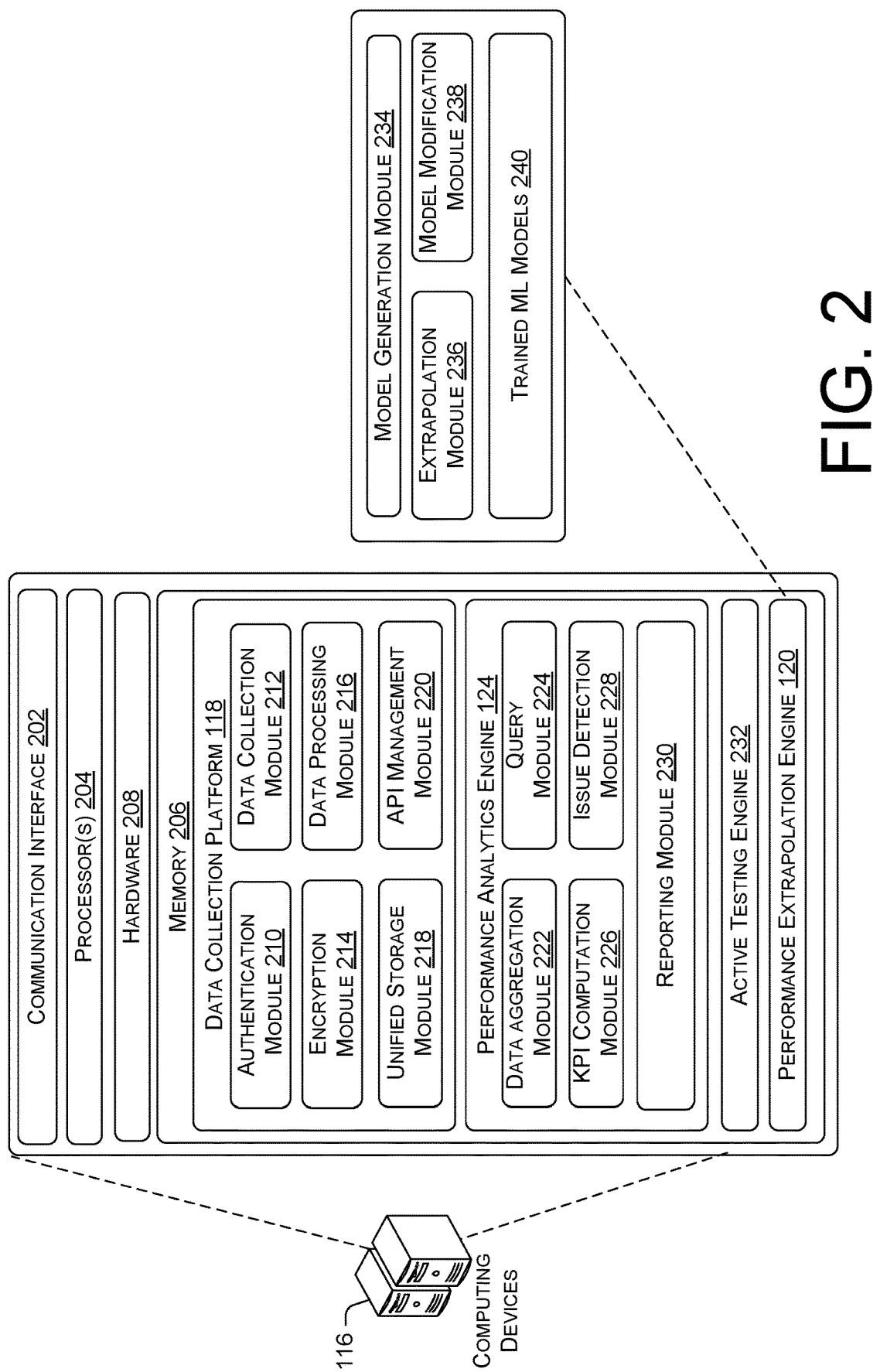
FIG. 2 is a block diagram showing various components of a performance analytics engine that analyzes performance data to assess QoE for user devices that use a communication network.

FIG. 2 is a block diagram showing various components of a performance analytics engine 118 that analyzes performance data to assess QoE for user devices that use a communication network. The performance analytics engine 118 may be implemented by one or more computing devices 116. The computing devices 116 may include a communication interface 202, one or more processors 204, memory 206, and hardware 208. Alternatively, the performance analytics engine 118 may be hosted on a virtual machine installed on a cloud service provider. In some cases, the performance analytics engine 118 may be hosted within a container, such as a Docker container, on a virtual machine. The communication interface 202 may include wireless and/or wired communication components that enable the one or more computing devices 116 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing device 200 may implement the data collection platform 110 and the performance analytics engine 118. The data collection platform 110 may include an authentication module 210, a data collection module 212, an encryption module 214, a data processing module 216, a unified storage module 218, and an API management module 220. The unified storage module 218 may be a part of the cloud layer of the data collection platform 110, while the remaining modules may be parts of the data management layer of the data collection platform 110. The modules may include routines, program instructions, objects, and/or data structures that perform particular tasks or implement particular abstract data types. The authentication module 210 may perform credential management and automated authentication to provide secure access to applications and data that are stored on different wireless carrier network. For example, the authentication module 210 may authenticate the data collection platform 110 to the communication network 102 for the purpose of retrieving the device performance data 108 from the communication network 102.

The data collection module 212 may include a workflow scheduler that periodically checks for and retrieves newly available data from data sources, such as the communication network 102. In turn, the communication network 102 may be responsible for retrieving the device performance data 108 and other call data from the monitoring applications 106(1)-106(N) via data push or data pull techniques. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing.

In various embodiments, the data collection module 212 may employ file transfer protocol (FTP), Hypertext Transfer Protocol (HTTP) posts, direct network infrastructure element connection, and/or other data transfer techniques to obtain device performance data 108 from the monitoring applications 106(1)-106(N). The device performance data 108 may be in the form of input data files, i.e., JavaScript Object Notation (JSON) records, which are received from the monitoring applications 106(1)-106(N) on the user devices 104(1)-104(N). In some embodiments, the data collection module 212 may perform data integrity tests to verify that the contents of the received data files are not corrupt.

The encryption module 214 may encrypt and/or decrypt sensitive data to provide additional data security. For example, the communication network 102 may encrypt the device performance data 108 via an asymmetric or symmetric encryption algorithm, and the encryption module 214 may decrypt the device performance data 108 using the same encryption algorithm. The data processing module 216 may implement adaptor-specific logics to decode the input data format into a metadata representation. Accordingly, the input data may be fed into other modules for analysis and storage. In various embodiments, the data processing module 216 may merge performance data as embodied in the JSON records of a particular time period into an integrated data file. Subsequently, the data processing module 216 may interpret the information in the integrated data file into a converted format that is readable to the performance analytics engine 118.

The unified storage module 218 may store data across multiple virtual data storage clusters with redundancy, so that the data may be optimized for quick access. The stored data may include the input data files, i.e., the JSON records, the integrated data file that includes data in the converted format, calculated data from the performance analytics engine 118, and/or so forth. In various embodiments, the performance data stored by the unified storage module 218 may include messages and configuration information of subscribers, in which the data are aggregated based on time, network infrastructure element, and/or user device model. The API management module 220 provides an API that may be accessed by other applications. Accordingly, the API may be used by the analytic engine 114 as well as other third-party application to access the data that received and stored by the data collection platform 110.

The performance analytics engine 118 may include a data aggregation module 222, a KPI computation module 226, an issue detection module 228, and a reporting module 230. The modules may include routines, program instructions, objects, and/or data structures that perform particular tasks or implement particular abstract data types.

The data aggregation module 222 may receive integrated data files of device performance data 108 from the data collection platform 110, in which the device performance data 108 may be in the converted format. In turn, the data aggregation module 222 may aggregate the received data into multiple data sets according to grouping parameters. The grouping parameters may include specific time periods (e.g., hourly, daily, etc.), routing network components, user device vendor types, user device models, and/or so forth. In other embodiments, the group parameters may be used to aggregate the device performance data 108 into multiple datasets that correspond to different levels of a telecommunication network hierarchy. For example, the device performance data 108 may be aggregated into data sets that correspond to a base station level, a Type Allocation Code (TAC) level, a service area level, and a geographical market level. The data aggregation module 222 may designate a data retention period for each dataset. Upon an expiration of the data retention period, the data in the corresponding dataset may be purged by the data aggregation module 222. In various embodiments, the grouping parameters that are used by the data aggregation module 222 to generate the data sets may be specified by a KPI configuration file or a QoE assessment query.

The query module 224 may receive QoE assessment queries that are inputted by users via a remote computing device. The QoE assessment queries may request one or more KPIs that provide QoE metrics with respect to specific groups of user devices and/or network components. Each specific group may include one or more user devices that are grouped according to one or more parameters. The parameters may include time periods, geographical locations, network component characteristics, user device characteristics, device user characteristics, device usage characteristics, and/or so forth. The network component characteristics may include specific network component types, specify network components that meet one certain performance thresholds, specify particular network component features, and/or so forth. The user device characteristics may include the presence or absence of specific hardware or software features that perform specific functions. The device user characteristics may include user demographic traits, payment history traits, upgrade trends, and/or so forth.

For example, the parameters for selecting a specific group of user device that is the subject of a QoE assessment query may specify user devices that are associated with or uses a particular base station, a particular air interface, a particular network cell, a particular service, a particular application, a particular third-party service provider, a particular router, a particular gateway, a particular core network component, a particular day and/or time, and/or so forth. Additionally, the parameters may further specify user devices that are associated with similarly situated network cells, similar weather condition/environment, same roaming condition, same service plan or service account, same usage scenario (e.g., a particular combination of applications), and/or so forth. Accordingly, the query module 224 may select different groups of user devices for analysis based on the QoE assessment queries.

The KPI computation module 226 may compute a set of KPIs from the performance data of user devices in a group. In some embodiments, the KPI computation module 226 may compute a set of KPIs based on a KPI configuration file. Thus, the KPI computation module 226 may be directed to compute new KPIs from the performance data in each dataset through the modifications of existing KPI configuration files or the addition of new KPI configuration files. In one example, the KPI computation module 226 may generate KPIs for various types of calling, such as circuit-switched calling or Wi-Fi calling, that are performed by a selected group of user devices. In another example, the KPI computation module 226 may generate KPIs for the uploading of data by the user devices and/or the downloading of data by the user devices. The KPI computation module 226 may provide comparisons of KPIs for different groups of user devices according to a KPI configuration file.

In other embodiments, the KPI computation module 226 may compute a set of KPIs in response to a QoE assessment query. A QoE assessment query may request specific KPIs for phone calls or data communication performed by a selected group of user devices. For example, a QoE assessment query may request an average number of dropped calls experience by a particular make and model of user devices during a specific time period in a selected geographical region. In another example, a QoE assessment query may request percentage of user devices that downloaded video content in a selected time period with a video quality mean opinion score (MOS) that is below a predetermined threshold.

The KPI computation module 226 may activate the performance extrapolation engine 120 when device performance data for generating KPIs with respect to a group of user device is missing. In such an instance, an extrapolation request that is sent by the KPI computation module 226 may include the identification information (e.g., manufacturer data, model data, version data, serial number, etc.) of the user devices that are missing the device performance data, the type of device performance data that is missing, the time period for which the device performance data is requested, and/or other relevant information. In some instances, certain device performance data may be missing for a user device because the user device lacks a monitoring application that is able to monitor the user device. In other instances, certain device performance data may be missing for a user device because the ability of a monitoring application on the user device to performance active performance testing is disabled. As a result, the monitoring application is unable to provide device performance data from active testing. Instead, the monitoring application is at best able to provide device performance data from passive monitoring. In still other instances, the certain device performance data may be missing for a user device because a monitoring application on the user device is completely disabled. In various embodiments, the KPI computation module 226 may determine the device performance data that is missing for a user device by comparing the desired device performance data for a QoE assessment query to the data sets that are stored by the data aggregation module 222 for the user device.

The issue detection module 228 may parse the generated KPIs and other collected data to automatically detect conditions based on condition detection rules and generate alerts based on alert rules. The detected conditions may include present performance issues with a user device or a network infrastructure element. The detected conditions may further include anomalies, or unexpected changes or deviations, in the performance of a user device or a network infrastructure element that deviates from a historical performance pattern or trend. The issue detection module 228 may generate alerts at the subscriber, the user device, and/or the network infrastructure element level. For example, the user alerts may include "unexpected voice quality degradation", "much lower coverage than average user", "Wi-Fi calling off and bad performance at home", "phone freeze", etc. The network alerts may include "poor voice performance with low traffic", "abnormal amount of handover failures", etc. The user device alerts may include "increased failures after software upgrade", "abnormal voice failures detected", "poor LTE radio reception detected", etc. In some embodiments, the alerts may provide or implement solutions for remedying faults. For example, when there is poor coverage, the corresponding user device alert may recommend that Wi-Fi calling be enabled on the user device. In another example, when there is an abnormal amount of handover failures, the corresponding network alert may trigger a modification of the handover rule that is used by base stations in a particular geographical area. In some instances, upon the detection of an issue, the issue detection module 228 may automatically trigger the execution of a new QoE assessment query.

The detection rules and the alert rules that are used by the issue detection module 228 may be updated in order to detect new conditions or generate new types of alerts. The updated detection rules may include detection rules that have been modified in accordance with user feedback. In at least one embodiment, the issue detection module 228 may cause the reporting module 230 to generate a user interface that enables users to rate the usefulness of a detected condition using a numerical rating scale, a positive/negative rating scale, user comments, and/or so forth. In turn, an operator of the performance analytics engine 118 may edit or modify one or more corresponding detection rules that detected the condition to generate updated detection rules. Likewise, the updated alert rules may include rules that have been modified in accordance with user feedback. In at least one embodiment, the issue detection module 228 may cause the reporting module 230 to generate a user interface that enables users to rate the effectiveness of an alert using a numerical rating scale, a positive/negative rating scale, user comments, and/or so forth. In turn, an operator of the performance analytics engine 118 may edit or modify one or more corresponding alert rules to generate the updated alert rules.

The reporting module 230 may generate multiple analytic views that present the KPIs and related analytics data as produced by the KPI computation module 226. In some instances, the analytics views may include a summary view, a subscriber aggregate view, a subscriber call view, a user device aggregate view, and a top offender view. For example, the summary view may include a topology tree that specific time frames of the performance data. For example, when a node of the topology tree is selected, the other information that is presented in the summary view may be updated. The summary view may further include a KPI selection control, a network map window, a time chart window, and a global performance control. The KPI selection control may be used to select specific KPIs that are to be shown in the network map window and the time chart window. The network map window may show call events clustered by geographic areas. The time chart window may show the historical value for each selected KPI. In various embodiments, the analytics views as generated by the reporting module 230 may be accessible at a remote computing device that is connected to the computing devices 116.

In additional embodiments, the data collection platform 110 may support additional engines that facilitate the performance analytics engine 118. These engines may include an active testing engine 232 and a performance extrapolation engine 120. The computer instructions and algorithms of each engine may execute in conjunction with the data collection platform 110 to perform specific tasks.

The active testing engine 232 may interface with a specific set of user devices that are equipped with monitoring applications, such as the monitoring applications 106(1)-106(N). The monitoring applications may automatically generate voice and/or data communication between the communication network 102 and the user devices. The voice and/or data communication may be generated to enable the monitoring applications to capture specific device performance data of the user devices. In turn, the monitoring applications on the user devices may report the captured device performance data to the performance analytic engine 124 via the data collection platform 110 so that one or more KPIs that measure QoE may be calculated.

In some embodiments, the one or more KPIs that are extrapolated by the performance extrapolation engine 120 for a user device may cause the active testing engine 232 to trigger active testing of the user device to obtain actual KPIs. For example, the performance analytics engine 124 may determine that each of one or more KPIs extrapolated for the user device does not match a corresponding acceptable value, or falls outside of a corresponding acceptable value range, in which such events may indicate that the user device has poor QoE. As a result, the performance analytics engine 124 may request the active testing engine 232 trigger a monitoring application on the user device to automatically generate voice and/or data communication with the communication network 102. Further, the monitoring application on the user device may capture device performance data of the user device during the generate voice and/or data communication for eventual delivery to the performance analytics engine 124. Subsequently, the performance analytics engine 124 may activate the KPI computation module 226 to calculate one or more actual KPIs that correspond to the one or more extrapolated KPIs for the user device. Thus, the one or more actual KPIs that validate the poor QoE may cause the performance analytic engine 124 to trigger an alert. For example, an extrapolated KPI may be validated by a calculated KPI if the values of the two KPIs match, the values of the two KPIs are within a predetermined numerical range of each other, and/or so forth.

The performance extrapolation engine 120 may include a model generation module 234, an extrapolation module 236, and a model modification module 238. The modules may include routines, program instructions, objects, and/or data structures that perform particular tasks or implement particular abstract data types. In various embodiments, the model generation module 234 may train machine learning models to extrapolate KPIs for a set of user devices. In such embodiments, the machine learning models may include Bayesian inference trees, Support Vector Machines (SVMs), decision trees, neural networks, and/or so forth. In one implementation, a machine learning model for extrapolating KPIs may be trained based on training data that includes calculated KPIs for a training set of user devices. The KPIs for the training set of user devices may be calculated based on measured device performance data provided by the training set of user devices. In some instances, the calculation of KPIs for the particular set of user devices may further involve the use of network performance data that correlates in time and/or area with the device performance data. The network performance data that correlates in time and/or area with the device performance data may also be used as a part of the training data for training the machine learning model. In some instances, the period of time and area ranges for the training data may be selected by the model generation module 234 to match the period of time and area that is specified by a QoE assessment query.

In another implementation, a machine learning model for extrapolating KPIs may be trained based on training data that includes calculated KPIs for a training set of user devices, as well as a table of device features that belong to each user device of the set of user devices. The device features of each user device may be identified from a device feature database using device type identification information (e.g., make, model, version number, etc.) of each user device. The device features may include sets of hardware features (e.g., radio model, memory capacity, battery capacity, processor model, etc.) and/or software features (e.g., Wi-Fi calling capability, web browser type, operating system version, etc.) that are specific to each user device for which KPIs are calculated. In some instances, the device features may also include the manufacturer and model information of the user devices. The training data may be specific to a particular period of time and/or area. In some instances, the period of time and area ranges for the training data may be selected by the model generation module 234 to match the period of time and area that is specified by a QoE assessment query. In this way, the model generation module 234 may generate the trained machine learning models 240 based on the various types of training data. In some alternative embodiments, the training data may include a combination of KPIs and one or more training features, in which a training feature is a mathematical combination of multiple KPIs from a specific time period and/or area. The mathematical combination may be calculated by applying one or more mathematical functions (e.g., algebraic, statistical, transcendental, etc.) to the multiple KPIs.

The extrapolation module 236 may use the trained machine learning models to extrapolate the data desired for a QoE assessment query. Following the receipt of an extrapolation request from the KPI computation module 226, the extrapolation module 236 may determine the specific user devices for which KPI data is to be extrapolated. In some instances, the extrapolation module 236 may apply a machine learning model to relevant network performance data to extract KPIs for the specific user devices. The relevant network performance data may be from a time period and area that is specified in a QoE assessment query. In other instances, the extrapolation module 236 may extrapolate KPIs for each specific user devices using a machine learning model that is trained partly using device feature data. In such instances, the extrapolation module 236 may determine the device features of a user device, then apply the machine learning model to the device features to extrapolate the KPIs for the user device. The extrapolation module 236 may perform such extrapolation for every user device to obtain the KPIs of the specific user devices.

The model modification module 238 may modify the data that is used to train the machine learning models based on user input. In various embodiments, a user may review the KPIs that are extrapolated for different sets of user devices. Based on the review, the user may input modifications to the model modification module 238 via a remote computing device. The modifications may include the exclusion of network performance data from certain network components, exclusion of device performance data from certain user devices, the exclusion of specific device features of user devices, exclusion of KPIs that belong to particular user devices, and/or so forth. For example, a review of the KPI extrapolation results may indicate that performance data for a certain class of user devices or network components may be skewing the KPI extrapolation results. Accordingly, the user may attempt to exclude such performance data to remedy the error.

Example Processes

FIGS. 3-6 present illustrative processes 300-600 for performing QoE extrapolation and diagnosis of communication network. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 300-600 are described with reference to the architecture 100 of FIG. 1.

Figure 3:
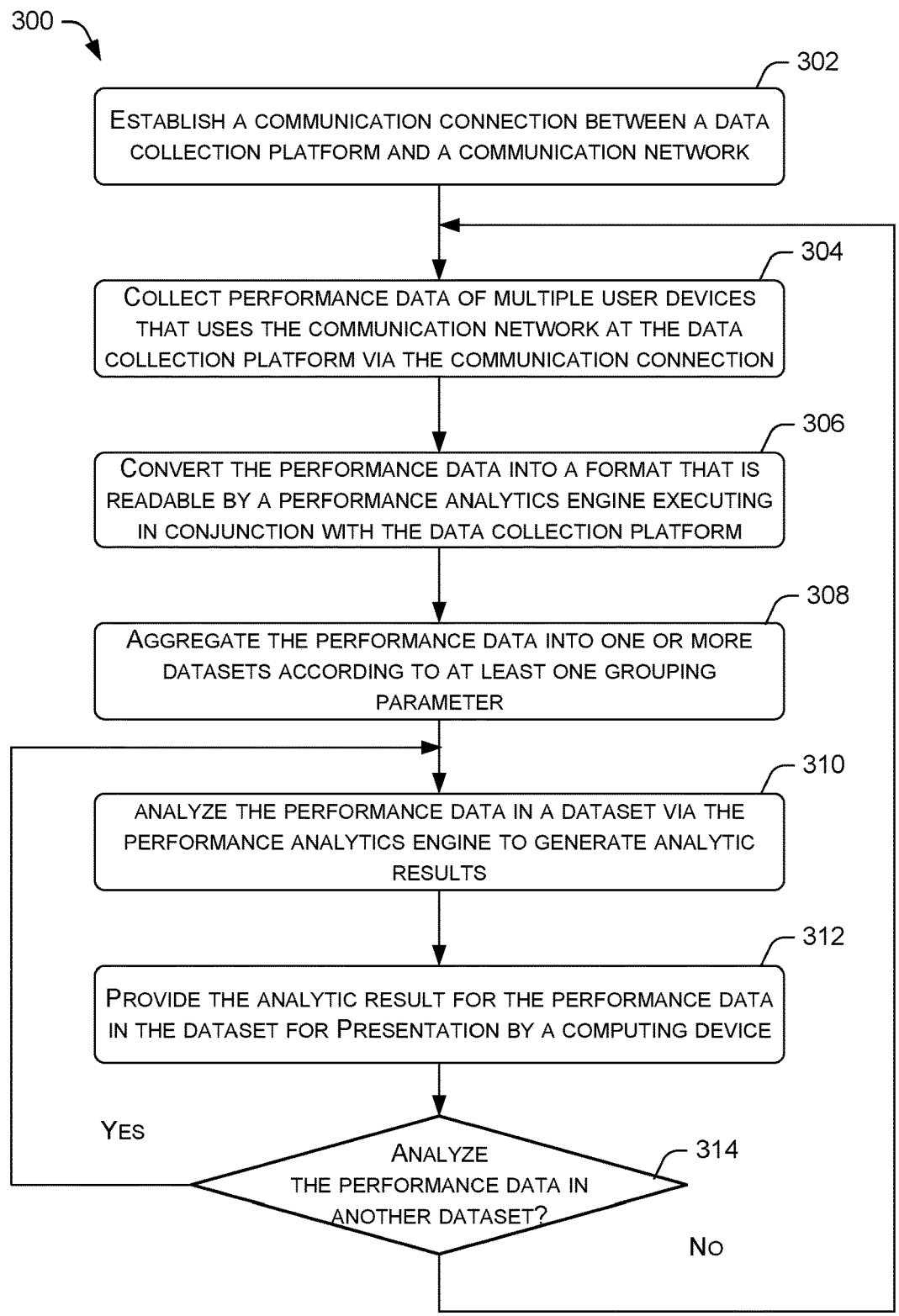
FIG. 3 is a flow diagram of an example process for implementing a performance analytics engine that analyzes performance data to assess QoE for user devices that use a communication network.

FIG. 3 is a flow diagram of an example process for implementing a performance analytics engine that analyzes performance data to assess QoE for user devices that use a communication network. At block 302, the data collection platform 110 may establish a communication connection with the communication network 102. In various embodiments, the communication connection may be established via the Internet 112. The communication connection may enable the data collection platform 110 to employ FTP, Hypertext Transfer Protocol (HTTP) posts, direct network infrastructure element connection, and/or other data transfer techniques to obtain the device performance data 108.

At block 304, the data collection platform 110 may collect the device performance data 108 of the user devices 104(1)-104(N) that are using the communication services provided by the communication network 102. The device performance data 108 may be generated by the monitoring applications 106(1)-106(N) that are on the user devices 104(1)-104(N) as the monitoring application monitor packet-based calls placed and received at the user devices 104(1)-104(N). The monitoring applications 106(1)-106(N) may send the device performance data 108 to the core network of the communication network 102. Accordingly, the device performance data 108 may be collected by the data collection platform 110 from the communication network 102 via the communication connection.

At block 306, the data collection platform 110 may convert the device performance data 108 into a format that is readable by the performance analytics engine 118 that executes in conjunction with the data collection platform 110. In various embodiments, the device performance data 108 that is collected for a particular time period may be in the form of input data files, i.e., JSON records. The data processing module 216 may merge performance data as embodied in the JSON records into an integrated data file. Subsequently, the data processing module 216 may convert the information in the integrated data file into a converted format that is readable to the performance analytics engine 118.

At block 308, the performance analytics engine 118 may aggregate the device performance data 108 into data sets according to at least one grouping parameter. In various embodiments, the grouping parameters may include a time period, routing network component, user device manufacturer, user device model, and/or so forth.

At block 310, the performance analytics engine 118 may analyze the performance data in a dataset. The analysis may include the calculation of one or more KPIs with respect to a usage of the communication network 102 by subscribers, user devices, and network infrastructure elements. In some instances, one or more KPIs may indicate an issue with a usage of the communication network 102 by one or more subscribers, an issue with one or more user devices, or an issue with one or more network infrastructure elements, and/so forth. Accordingly, the performance analytics engine 118 may generate one or more alerts regarding such issues.

At block 312, the performance analytics engine 118 may provide analytic result for the performance data in the dataset for display on a computing device or a user device. In some embodiments, the analytics result may be in the form of one or more analytics reports that are provided for presentation on the computing device in response to view requests. The analytics may be provided to the computing device via an API of the performance analytics engine 118. For example, the one or more views may include a summary view, a subscriber aggregate view, a subscriber call view, a user device aggregate view, and/or a top offender view. In other embodiments, the analytic result may be in the form of one or more alerts that are provided for presentation on the computing device or an affected user device.

At decision block 314, the performance analytics engine 118 may determine whether the performance data in another dataset is to be analyzed. In various embodiments, the performance analytics engine 118 may make the determination based on stored configuration settings or a manually inputted analysis request. Accordingly, if the performance analytics engine 118 determines that the performance data in another dataset is to be analyzed ("yes" at decision block 314), the process 300 may loop back to block 310 so that additional dataset analysis may be performed. However, if the performance analytics engine 118 determines that no further datasets are to be analyzed ("no" at decision block 314), the process 300 may loop back to block 304, such that the data collection platform 110 may collect additional device performance data 108 from the user devices 104(1)-104(N).

Figure 4:
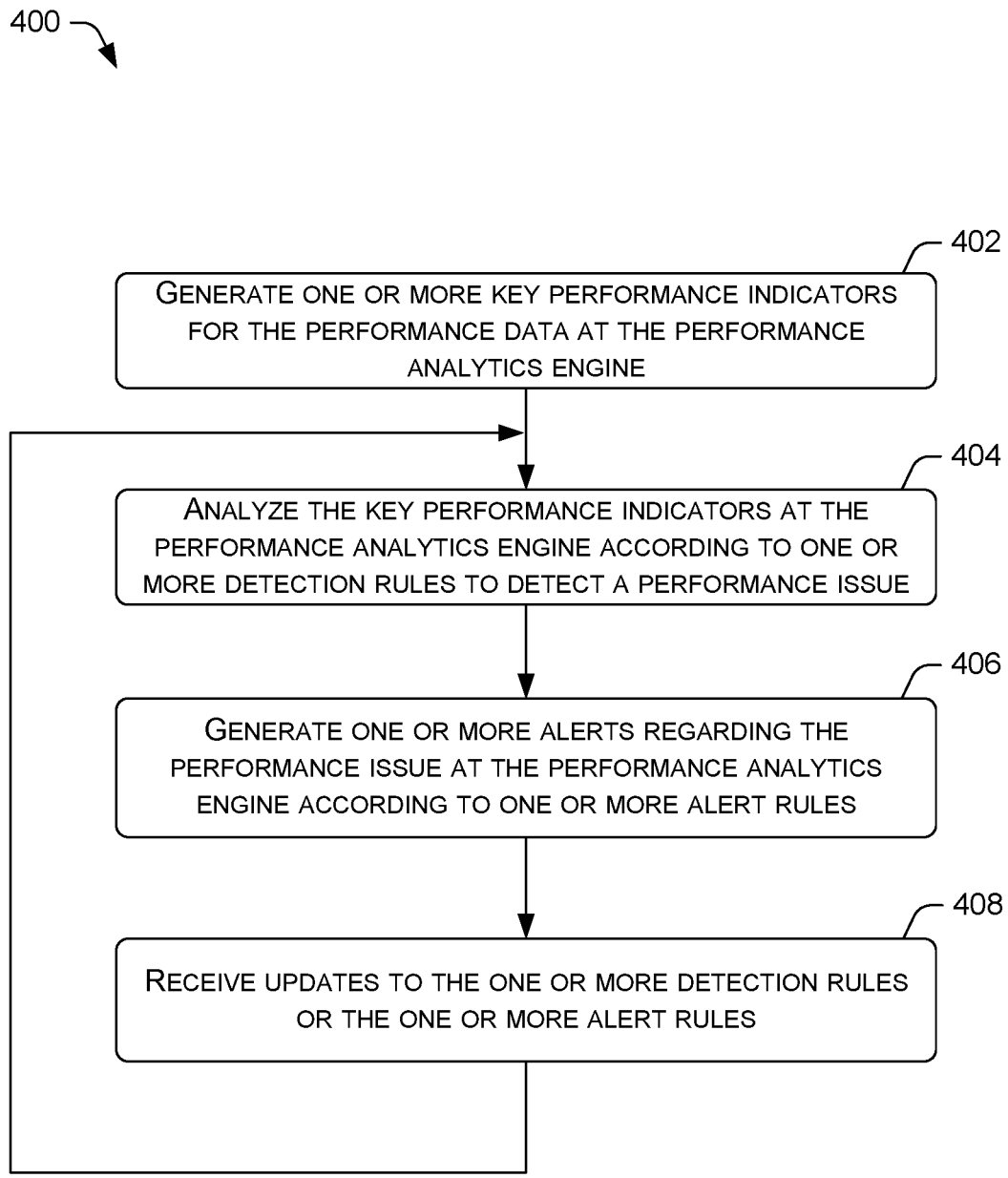
FIG. 4 is a flow diagram of an example process for detecting issues with respect to user devices that are using a communication network and generating alerts regarding the issues.

FIG. 4 is a flow diagram of an example process 400 for detecting issues with respect to user devices that are using the communication network 102 and generating alerts regarding the issues. The process 400 may further illustrate block 310 of the process 300. At block 402, the performance analytics engine 118 may generate one or more KPIs for the call data in a data set. For example, the KPIs may include a dropped call rate (DCR) for a time period, an average failure rate (AFR) for the time period, a call setup time (CST) during the time period, an audio quality mean opinion score (MOS) for the time period, handover failure rate for the time period, and coverage for the time period with respect to one or more subscribers, user devices, network infrastructure elements, and/or so forth. The KPIs may be generated based on custom KPI configuration settings, which may be modified via an updated KPI configuration file to enable the generation of additional or different KPIs.

At block 404, the performance analytics engine 118 may analyze the KPIs according one or more detection rules to detect a call issue. The call issue may be a condition that affects one or more user devices of subscribers or one or more network infrastructure elements of the wireless carrier network. In various embodiments, the detection rules may be modified or updated via a detection configuration file such that different or additional call issues may be detected.

At block 406, the performance analytics engine 118 may generate one or more alerts regarding the call issue according to one or more alert rules. For example, a series of KPIs that are generated by the performance analytics engine 118 over time may trigger an alert that an abnormal condition is developing with respect to some VoLTE-related network infrastructure components of a wireless carrier network. In various embodiments, the alert rules may be modified or updated via an alert rule configuration file such that different or additional alerts concerning call issues may be initiated.

At block 408, the performance analytics engine 118 may receive updates to the one or more detection rules or the one or more alert rules. In various embodiments, the updates may be developed based on user feedback regarding the effectiveness of the detection rules in detecting call issues and/or the effectiveness of the alert rules. For example, a detection rule may be refined to be more sensitive to the detection of network infrastructure failure within the communication network 102. In another example, an alert rule may be refined to provide a faster alert with respect to the failure of a LTE radio in a user device. Subsequently, the process 400 may loop back to block 404 such that additional detections and/or alerts may be performed based on the updated detection and/or alert rules.

Figure 5:
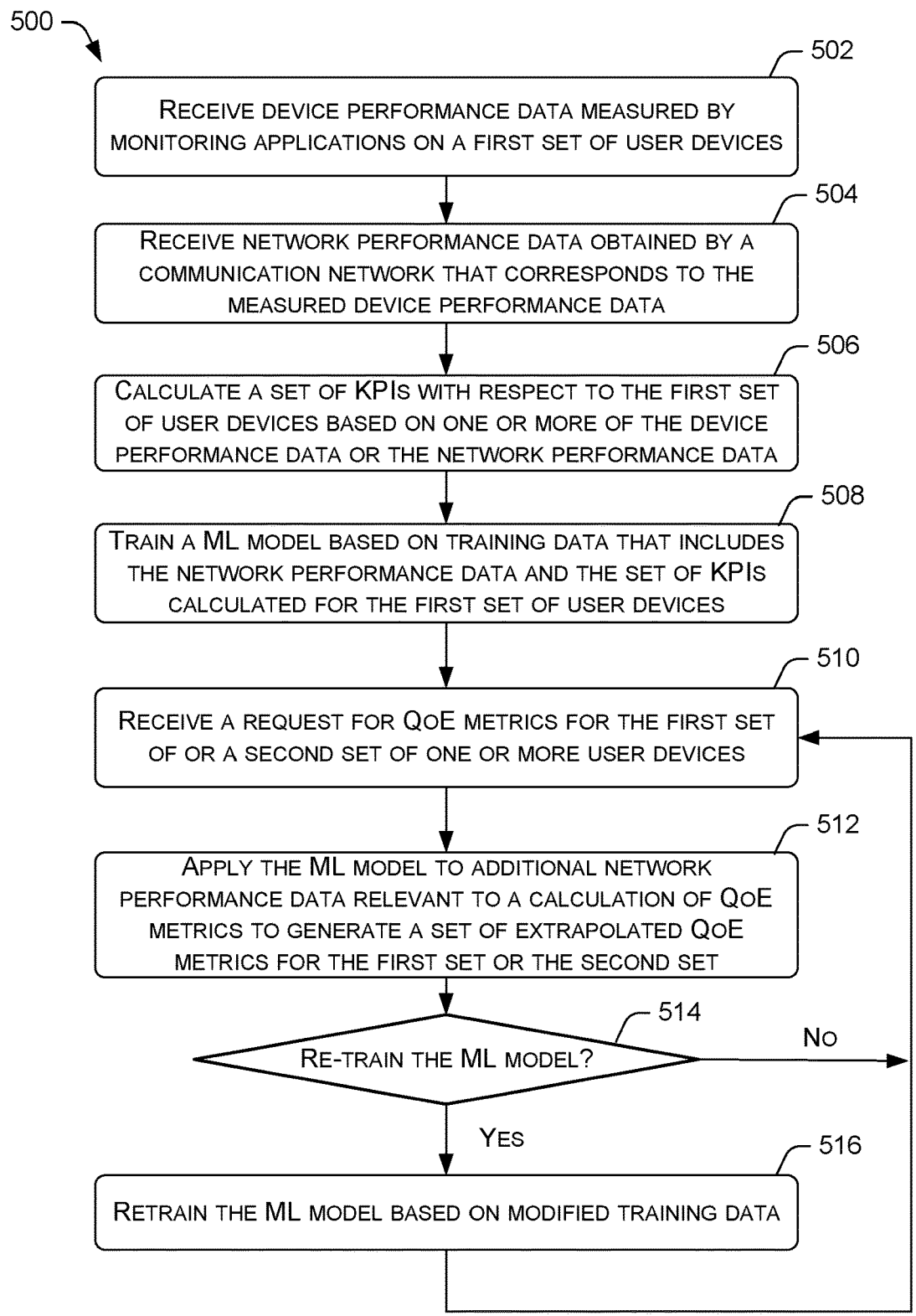
FIG. 5 is a flow diagram of an example process for generating Quality of experience (QoE) metrics for a set of user devices using a machine learning model based on network performance data.

FIG. 5 is a flow diagram of an example process 500 for generating QoE metrics for a set of user devices using a machine learning model based on network performance data. At block 502, the performance analytics engine 118 may receive device performance data measured by the monitoring applications on a first set of user devices. In various embodiments, the performance extrapolation engine 120 may receive the device performance data from the data collection platform 110.

At block 504, the performance analytics engine 118 may receive network performance data obtained by a communication network, in which the network performance data may correspond to the measured device performance data. In various embodiments, the correspondence between the network performance data and the device performance data may be based on a commonality in time period and/or commonality in area. For example, the device performance data may be obtained from user devices that are served by a base station in a particular area during a predetermined time period, and the network performance data may include performance data regarding the base station in the particular area for the predetermine time period.

At block 506, the performance analytics engine 118 may calculate a set of KPIs with respect to the first set of user devices based on one or more of the device performance data or the network performance data. In various embodiments, the performance analytics engine 118 may generate key performance indicators (KPIs) from the performance data based on KPI configuration settings or a query.

At block 508, the performance extrapolation engine 120 may train a machine learning model based on the training data that includes the network performance data and the set of KPIs calculated for the first set of user devices. In some alternative embodiments, the training data may include a combination of the set of KPIs and training features in place of the set of KPIs, in which a training feature is a mathematical combination of multiple KPIs from a specific time period and/or spatial region. In various embodiments, the machine learning model may be a Bayesian inference tree, a Support Vector Machine (SVM), a decision tree, a neural network, and/or so forth.

At block 510, the performance extrapolation engine 120 may receive a request for additional QoE metrics for the first set or a second set of one or more user devices. In various embodiments, the second set of one or more user devices may be selected based on a QoE assessment query that is manually inputted by a user or automatically generated by the performance analytic engine 118 in response to an alert. In various embodiments, the one or more user devices in the second set may include a user device whose KPIs are requested by the QoE assessment query, but which may not have provided the desired device performance data for calculating the KPIs to the performance analytics engine 118. Accordingly, the performance analytics engine 118 may send a QoE metric request for the one or more devices in the second set to the performance extrapolation engine 120.

At block 512, the performance extrapolation engine 120 may apply the machine learning model to additional network performance data relevant to a calculation of the QoE metrics to generate a set of extrapolated QoE metrics that includes KPIs for the first set or the second set of one or more user devices. In various embodiments, the additional network performance data may belong to the time period and/or area specified QoE assessment query. In other words, the additional network performance data corresponds to the time period and/or area in which the one or more user devices of the first set or the second set were operating, and for which QoE metrics are being sought.

At decision block 514, the performance extrapolation engine 120 may determine whether the machine learning model is to be re-trained. In various embodiments, the machine learning model may be retrained in response to a user command that is inputted by a user. Accordingly, if the performance extrapolation engine 120 determines that the machine learning model is to be retrained ("yes" at decision block 514), the process 500 may proceed to block 516.

At block 516, the performance extrapolation engine 120 may retrain the machine learning model based on modified training data. In various embodiments, the training data may be modified by excluding network performance data from certain network components, excluding the KPIs of certain user devices, and/or so forth. However, if the performance extrapolation engine 120 determines that the machine learning model is not to be retrained ("no" at decision block 514), the process 500 may loop back to block 510.

Figure 6:
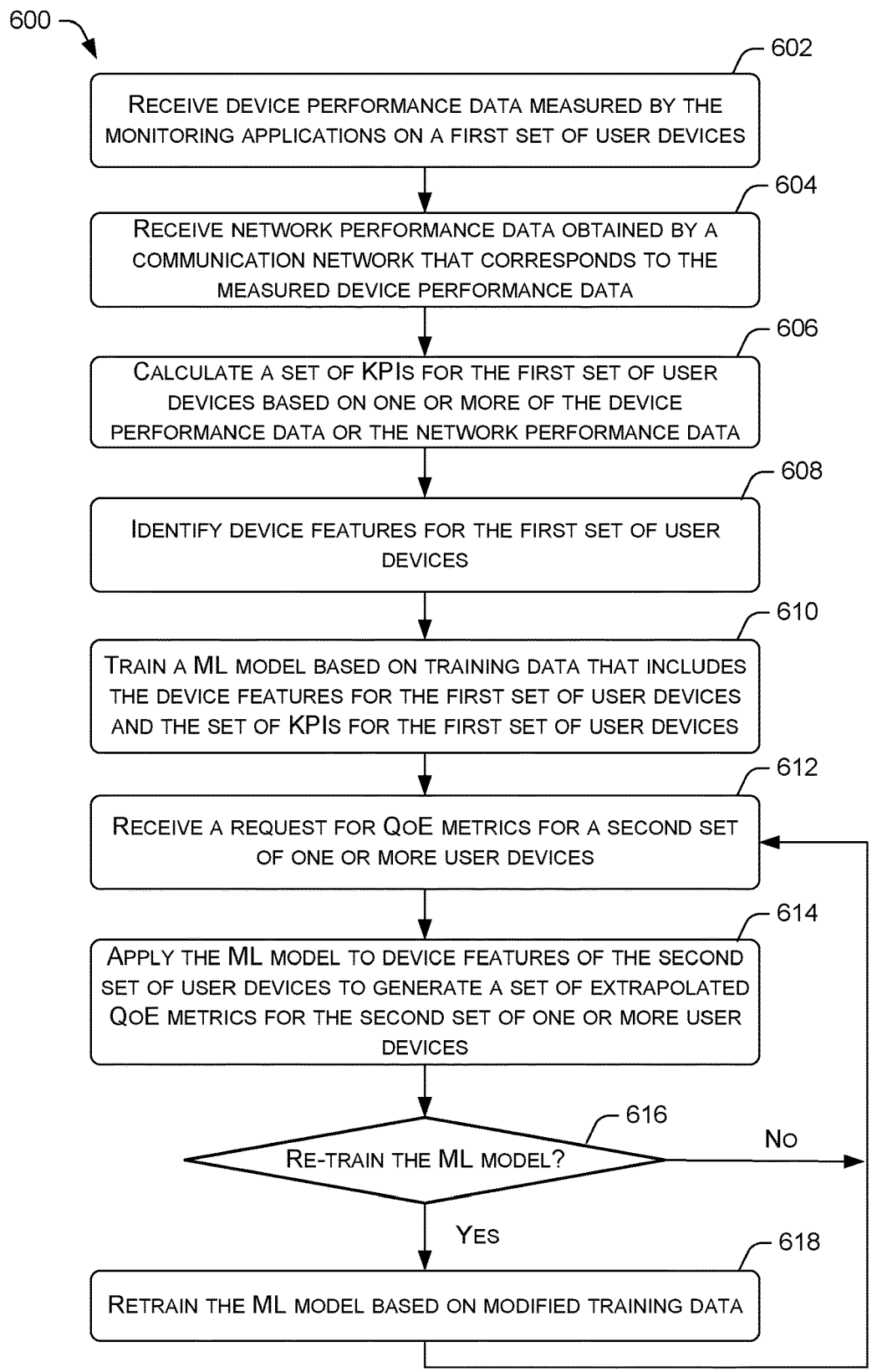
FIG. 6 is a flow diagram of an example process for using a machine learning model to extrapolate QoE metrics for a set of user devices using a machine learning model that takes into account commonalities in device features.

FIG. 6 is a flow diagram of an example process 600 for using a machine learning model to extrapolate QoE metrics for a set of user devices using a machine learning model that takes into account commonalities in device features. At block 602, the performance analytics engine 118 may receive device performance data measured by the monitoring applications on a first set of user devices. In various embodiments, the performance extrapolation engine 120 may receive the device performance data from the data collection platform 110.

At block 604, the performance analytics engine 118 may receive network performance data obtained by a communication network, in which the network performance data may correspond to the measured device performance data. In various embodiments, the correspondence between the network performance data and the device performance data may be based on a commonality in time period and/or commonality in area. For example, the device performance data may be obtained from user devices that are served by a base station during a predetermined time period, and the network performance data may include performance data regarding the base station for the predetermine time period.

At block 606, the performance analytics engine 118 may calculate a set of KPIs with respect to the first set of user devices based on one or more of the device performance data or the network performance data. In various embodiments, the performance analytics engine 118 may generate key performance indicators (KPIs) from the device performance data and/or the network performance data based on KPI configuration settings or a query.

At block 608, the performance extrapolation engine 120 may identify device features for the first set of user devices. In various embodiments, the device features of each user device in the first set of user devices may be identified. The device features of each user device may be identified from a device feature database using device type identification information (e.g., make, model, version number, etc.) of each user device. The device features may include sets of hardware features (e.g., radio model, memory capacity, battery capacity, processor model, etc.) and/or software features (e.g., Wi-Fi calling capability, web browser type, operating system version, etc.) that are specific to each user device.

At block 610, the performance extrapolation engine 120 may train a machine learning model based on the training data that includes the device features for the first set of user devices and the set of KPIs calculated for the first set of user devices. In some alternative embodiments, the training data may include a combination of the set of KPIs and training features in place of the set of KPIs, in which a training feature is a mathematical combination of multiple KPIs from a specific time period and/or spatial region. In various embodiments, the machine learning model may be a Bayesian inference tree, a Support Vector Machine (SVM), a decision tree, a neural network, and/or so forth.

At block 612, the performance extrapolation engine 120 may receive a request for QoE metrics for a second set of one or more user devices. In various embodiments, the second set of one or more user devices may be selected based on a QoE assessment query that is manually inputted by a user or automatically generated by the performance analytic engine 118 in response to an alert. In various embodiments, the one or more user devices in the second set may be user devices whose KPIs are requested by the QoE assessment query, but which may not have provided the desired device performance data for calculating the KPIs to the performance analytics engine 118. Accordingly, the performance analytics engine 118 may send a QoE metric request for the one or more devices in the second set to the performance extrapolation engine 120.

At block 614, the performance extrapolation engine 120 may apply the machine learning model to device features of each user device in the second set of one or more user devices to generate a set of QoE metrics that includes extrapolated KPIs for the second set of one or more user devices. At decision block 616, the performance extrapolation engine 120 may determine whether the machine learning model is to be re-trained. In various embodiments, the machine learning model may be retrained in response to a user command that is inputted by a user. Accordingly, if the performance extrapolation engine 120 determines that the machine learning model is to be retrained ("yes" at decision block 616), the process 600 may proceed to block 618.

At block 618, the performance extrapolation engine 120 may retrain the machine learning model based on modified training data. In various embodiments, the training data may be modified by excluding the KPIs of certain user devices, excluding device features of specific user devices, and/or so forth. However, if the performance extrapolation engine 120 determines that the machine learning model is not to be retrained ("no" at decision block 616), the process 600 may loop back to block 612.

The implementation of the performance analytics engine to execute in conjunction with the data collection platform may provide a unified and scalable solution for providing QoE diagnosis with respect to user devices of a communication network. The data collection platform may enable the use of custom analytics engines to provide KPIs to a wireless carrier network for areas such as network development, operations, and customer care. The KPIs that are provided by the performance analytics engine from the performance data may be otherwise overly burdensome or virtually impossible to manually obtain in a timely manner due to the large volume of call data that typically inundate a wireless carrier network. Further, the techniques may provide an advanced approach to customer care with proactive and individualized treatments of wireless subscribers in real time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    calculating a set of key performance indicators (KPIs) for a first set of one or more user devices based on at least one of device performance data of the first set of one or more user devices or network performance data of a communication network that provides communication services to the first set of one or more user devices, the device performance data having at least one of temporal or geographical commonality with the network performance data;
    identifying respective device features of the first set of one or more user devices;
    training a machine learning (ML) model based on training data that includes the network performance data, the respective device features of the first set of one or more user devices, and the set of KPIs calculated for the first set of one or more user devices;
    determining that device performance data of a second set of one or more user devices is missing, the second set of one or more user devices including one or more user devices not included in the first set of user devices; and
    in response to determining that the device performance data for the second set of one or more user devices is missing, applying the ML model to respective device features of the second set of one or more user devices and additional network performance data of the communication network to extrapolate one or more extrapolated KPIs for the second set of one or more user devices, the one or more extrapolated KPIs including one or more quality of experience (QoE) metrics.

2. The one or more non-transitory computer-readable media of claim 1, wherein the acts further comprise receiving a request for the one or more QoE metrics for the second set of one or more user devices.

3. The one or more non-transitory computer-readable media of claim 1, wherein the acts further comprise:
    analyzing the one or more extrapolated KPIs according to one or more detection rules to detect a call issue that affects one or more user devices of the second set that are using the communication network or one or more network infrastructure elements of the communication network; and
    generating an alert regarding the call issue affecting the one or more user devices of the second set according to at least one alert rule.

4. The one or more non-transitory computer-readable media of claim 3, wherein the acts further comprise:
    triggering a monitoring application on a user device of the second set of user devices to generate at least one of voice or data communication with the communication network in response to the alert, and capturing device performance data of the user device during the voice or data communication; and
    calculating an actual KPI that corresponds to an extrapolated KPI of the user device based at least on the device performance data of the user device.

5. The one or more non-transitory computer-readable media of claim 4, wherein the acts further comprise triggering an additional alert in response to the actual KPI validating an extrapolated KPI that caused a detection of the call issue.

6. The one or more non-transitory computer-readable media of claim 1, wherein the acts further comprise retraining the ML model based on modified training data that excludes one or more of particular network performance data of a network component in the communication network or excludes one or more KPIs calculated for a particular user device in the first set.

7. The one or more non-transitory computer-readable media of claim 1, wherein the device performance data of a user device of the first set of one or more user devices is obtained by a monitoring application installed on the user device, the device performance data including one or more of Voice over LTE (VoLTE call data), circuit-switch call data, Wi-Fi call data, data packet transmission events, device event log data, system event reports, bug reports, data traffic logs, data packet traces, IP application protocols data, or application-level QoE data.

8. The one or more non-transitory computer-readable media of claim 1, wherein the network performance data of the communication network includes one or more of Radio Access Network (RAN) Operation Support System (OSS) counters, Call Detail Records (CDRs), VoLTE call traces, Session Initiation Protocol (SIP) trace data, IP trace data, or Real-Time Transport Protocol (RTP) Control Protocol (RTCP) trace data.

9. The one or more non-transitory computer-readable media of claim 1, wherein the calculating includes calculating the set of KPIs based on at least one of the device performance data or the network performance data of one or more of a particular time period or a particular geographical region.

10. The one or more non-transitory computer-readable media of claim 1, wherein the second set of one or more user devices is selected for KPI extrapolation in response to a manual input or an alert.

11. A system, comprising:
    one or more processors; and
    memory including a plurality of computer-executable components that are executable by the one or more processors to perform a plurality of actions, the plurality of actions comprising:
        calculating a set of key performance indicators (KPIs) for a first set of one or more user devices based on at least one of device performance data of the first set of one or more user devices or network performance data of a communication network that provides communication services to the first set of one or more user devices, the device performance data having at least one of temporal or geographical commonality with the network performance data;

identifying respective device features of the first set of one or more user devices;

training a machine learning (ML) model based on training data that includes the respective device features of the first set of one or more user devices and either the set of KPIs calculated for the first set of one or more user devices or a combination of the set of KPIs calculated for the first set of one or more user devices and one or more training features, each training feature including a mathematical combination of multiple KPIs that belong to at least one of a specific time period or a specific area from the set of KPIs;

determining that device performance data of a second set of one or more user devices is missing, the second set of one or more user devices including user devices not included in the first set of user devices; and in response to determining that the device performance data for the second set of one or more user devices is missing, applying the ML model to respective device features of the second set of one or more user devices to extrapolate one or more extrapolated KPIs for the second set of one or more user devices, the one or more extrapolated KPIs including one or more quality of experience (QoE) metrics.

12. The system of claim 11, wherein the actions further comprise receive a request for the one or more QoE metrics for the second set of one or more user devices.

13. The system of claim 11, wherein the actions further comprise:

analyzing the one or more extrapolated KPIs according to one or more detection rules to detect a call issue that affects one or more user devices of the second set that are using the communication network or one or more network infrastructure elements of the communication network; and generating an alert regarding the call issue affecting the one or more user devices of the second set according to at least one alert rule.

14. The system of claim 13, wherein the actions further comprise:

triggering a monitoring application on a user device of the second set of user devices to generate at least one of voice or data communication with the communication network in response to the alert, and capturing device performance data of the user device during the voice or data communication; and calculating an actual KPI that corresponds to an extrapolated KPI of the user device based at least on the device performance data of the user device.

15. The system of claim 14, wherein the actions further comprise triggering an additional alert in response to the actual KPI validating an extrapolated KPI that caused a detection of the call issue.

16. The system of claim 14, wherein the actions further comprise retraining the ML model based on modified training data that excludes one or more of particular network performance data of a network component in the communication network or excludes one or more KPIs calculated for a particular user device in the first set.

17. The system of claim 11, wherein the device performance data of a user device of the first set of one or more user devices is obtained by a monitoring application installed on the user device, the device performance data including one or more of Voice over LTE (VoLTE call data), circuit-switch call data, Wi-Fi call data, data packet transmission events, device event log data, system event reports, bug reports, data traffic logs, data packet traces, IP application protocols data, or application-level QoE data.

18. The system of claim 11, wherein the network performance data of the communication network includes one or more of Radio Access Network (RAN) Operation Support System (OSS) counters, Call Detail Records (CDRs), VoLTE call traces, Session Initiation Protocol (SIP) trace data, IP trace data, or Real-Time Transport Protocol (RTP) Control Protocol (RTCP) trace data.

19. The system of claim 11, wherein the device features of a user device in the first set or the second set includes a device hardware feature or a device software feature.

20. A computer-implemented method, comprising:

receiving device performance data measured by monitoring applications on a first set of one or more user devices;

receiving network performance data of a communication network that provides communication services to the first set of one or more user devices, the device performance data having at least one of temporal or geographical commonality with the network performance data;

calculating a set of key performance indicators (KPIs) for the first set of one or more user devices based on at least one of device performance data of the first set of one or more user devices or network performance data of the communication network;

identifying respective device features of the first set of one or more user devices;

training a machine learning (ML) model based on training data that includes the network performance data, the respective device features of the first set of one or more user devices and either the set of KPIs calculated for the first set of one or more user devices or a combination of the set of KPIs calculated for the first set of one or more user devices and one or more training features, each training feature including a mathematical combination of multiple KPIs that belong to at least one of a specific time period or a specific area from the set of KPIs;

determining that device performance data of a second set of one or more user devices is missing, the second set of one or more user devices including user devices not included in the first set of user devices;

in response to determining that the device performance data for the second set of user devices is missing, applying the ML model to respective device features of the second set of one or more user devices and additional network performance data of the communication network to extrapolate one or more extrapolated KPIs for the second set of one or more user devices, the one or more extrapolated KPIs including one or more quality of experience (QoE) metrics; and analyzing the one or more extrapolated KPIs according to one or more detection rules to detect a call issue that affects one or more user devices of the second set that are using the communication network or one or more network infrastructure elements of the communication network; and generating an alert regarding the call issue affecting the one or more user devices of the second set according to at least one alert rule.

* * * * *